Dec. 18, 1951     E. E. MILLS     2,579,390
METHOD OF MAKING HOLLOW ARTICLES
Filed June 30, 1950     2 SHEETS—SHEET 1

Inventor
Elmer E. Mills
By
Attorney

Dec. 18, 1951  E. E. MILLS  2,579,390
METHOD OF MAKING HOLLOW ARTICLES
Filed June 30, 1950  2 SHEETS—SHEET 2

Inventor
Elmer E. Mills
By
Attorney

Patented Dec. 18, 1951

2,579,390

UNITED STATES PATENT OFFICE 2,579,390

METHOD OF MAKING HOLLOW ARTICLES

Elmer E. Mills, Highland Park, Ill.

Application June 30, 1950, Serial No. 171,340

11 Claims. (Cl. 18—56)

This invention relates, in general, to a method of fabricating hollow articles, such as containers and particularly bottles, substantially automatically from a tube of plastic material.

Persons acquainted with the methods presently in use for manufacturing containers from thermo-plastic material are well aware of the costliness and low production rates of such methods. These methods each involve the use of a discontinuous process of fabrication wherein each container is individually fabricated almost as if it were a custom-made article. The machines necessary to carry out these methods are each an expensive and bulky unit with a low volume of production per unit.

Accordingly, a primary object of my invention is the provision of an improved method for fabricating hollow articles, such as containers, from a thermo-plastic material, which will require much less complicated and costly machinery to carry out.

A further object of my invention is the provision of an improved method for fabrication of hollow articles, as aforesaid, whereby the output of each individual fabrication machine may be greatly increased.

A further object of my invention is the provision of a method for fabricating hollow articles, as aforesaid, which eliminates all of the intermediate handling and steps presently required between the actual container farbricating process and the process of preparing the plastic material in a suitable form for fabrication.

Further objects and purposes of this invention will become apparent to persons familiar with this type of equipment and manufacturing process upon reading the following specification and referring to the accompanying drawings.

In executing the objects and purposes of my invention I employ a method for fabricating hollow articles from softened, tubular, plastic material. Each hollow article is formed within one of a number of movable dies. The dies are closed upon the tubular material and the section of tubular material contained within each die is individually expanded to the desired size and shape.

This application is a continuation-in-part of my copending application entitled "Machine for Making Hollow Articles," Serial No. 119,335 filed October 3, 1949, and Patent No. 2,515,093. My above-identified copending application describes one preferred embodiment of a machine suitable for carrying out the process herein disclosed. A sufficient description of this machine is included herein to clarify the operation of my process.

Figure 1:
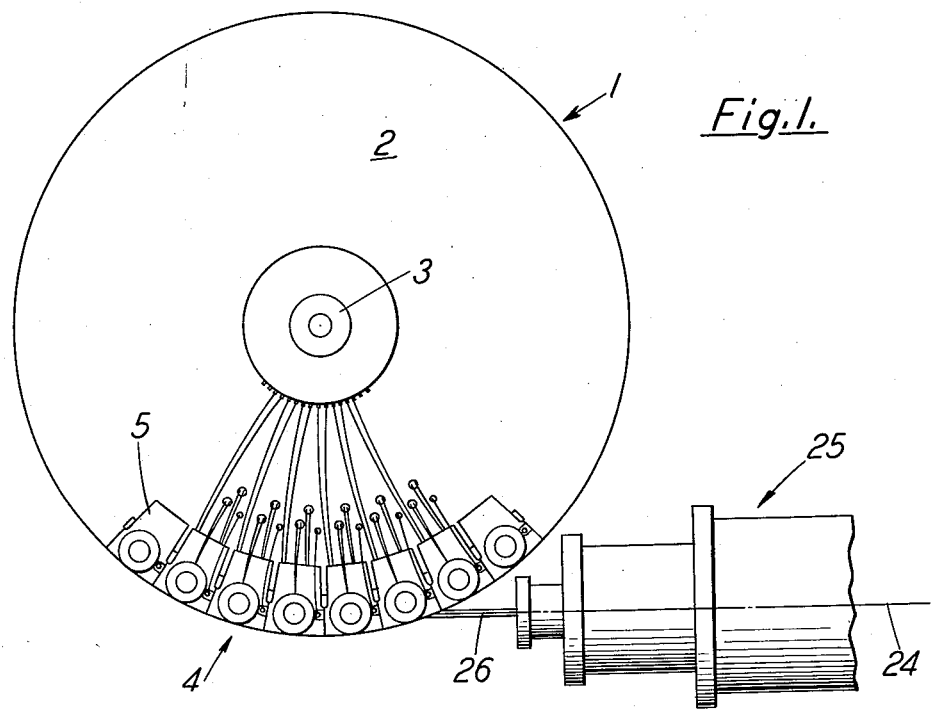
Figure 1 is a fragmentary, plan view of a machine suitable for conducting my process and shows a fragment of a plastic extruding machine.

Referring to Figure 1, the numeral 1 refers to a molding machine having a circular table 2 rotatably mounted by means of the center post 3 on a pedestal of any suitable type. The pedestal is not illustrated since it may be of any conventional construction.

Figure 2:
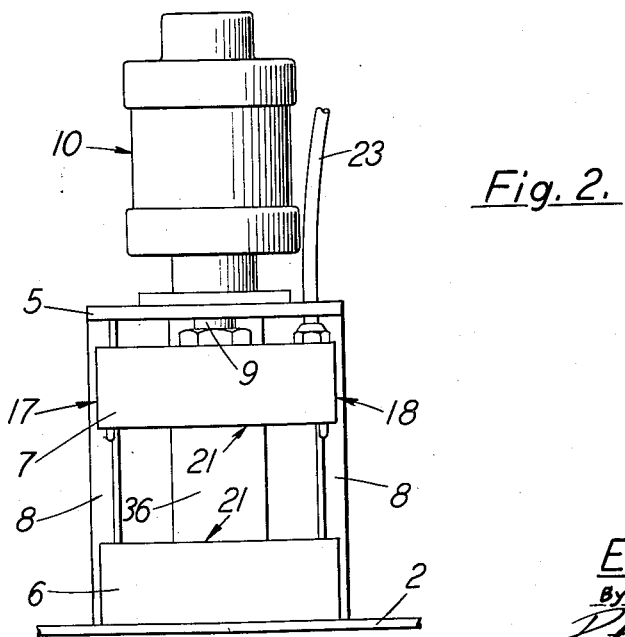
Figure 2 is a front, elevation view of a pair of mold halves and the supporting frame therefor.

Radially aligned about the periphery of the table 2 are a plurality of molds 4 (Fig. 1), each having a frame including a plate 5 (Fig. 2) supported above the table 2 by means of the support post 36. Within the frame is mounted a die or mold block consisting of a fixed lower mold half 6 and a movable upper mold half 7. The upper mold half 7 is attached to the vertical guide bars 8 for vertical, sliding reciprocation. The reciprocation of the upper mold half 7 is effected through the piston 9 by means of the double acting cylinder 10 mounted on the plate 5.

Figure 3:
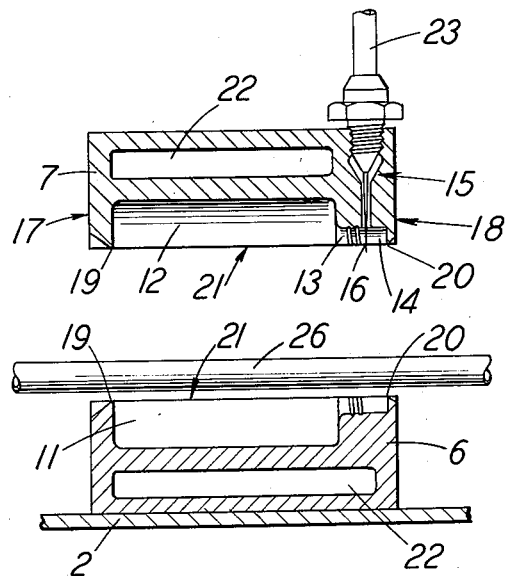
Figure 3 is a longitudinal, central, sectional view of an open mold.
Figure 5:
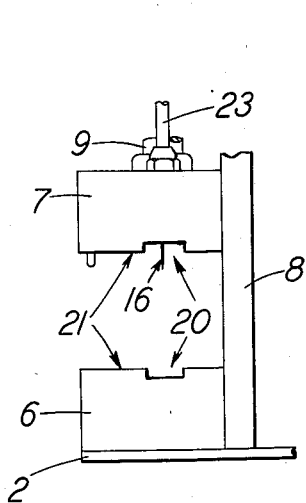
Figure 5 is a fragmentary, side, elevation view of an open mold.
Figure 4:
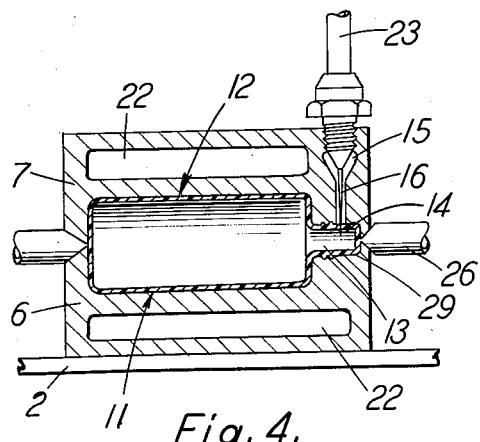
Figure 4 is a longitudinal, central, sectional view of a closed mold.

The mold halves 6 and 7 (Figs. 3 and 4) each have an internal mold cavity 11 and 12, respectively. The mold cavities 11 and 12 are, at one end, each provided with a neck portion 13 and an extended neck portion 14. The mold cavities 11 and 12 together with the neck portion 13 and the extended neck portion 14 form the molding chamber.

The upper mold half 7 is provided with an opening 15 therethrough which communicates between the outside surface of the die block and the mold cavity 12 above the extended neck portion 14 thereof. A hollow needle 16, such as a hypodermic needle, is disposed within the opening 15 and extends into the extended neck portion 14 of the mold cavity so that it pierces the extension of the hollow article formed within the extended neck portion 14, which extension is later removed.

The lateral ends 17 and 18 of both the upper and lower mold halves are beveled adjacent the mold cavities to form the jaws 19 and 20, respectively, which jaws are preferably slightly recessed from the adjacent meeting surfaces 21 of the molds. Although the beveling of the molds to form the jaw is preferable, it is not essential to the satisfactory operation of the machine. The upper and lower mold halves 7 and 6, respectively, are each provided with fluid chambers 22 whereby the temperature of the mold may be controlled.

The cylinder 10 is actuated hydraulically or pneumatically by a fluid under pressure. The needle 16 is supplied with a pressurized fluid through the tube 23. The arrangement of the fluid conduits and the various flow control means for these fluids for regulating the operation of the mold and the needle are not described since they form no part of this invention and are fully disclosed in my above-identified copending application. The same is true of the fluid conduits and controls for supplying the fluid chambers 22.

The table 2 is positioned such that the central axis of each of the molds between the jaws 19 and 20 becomes tangent, as the table rotates, to the longitudinal axis 24 of a source of hollow or tubular plastic material such as the extrusion machine 25. The upper mold half 7 is spaced apart from the lower mold half 6 as the molds align with tubular material 26 issuing from the extrusion machine 25. The upper mold half 7 is subsequently closed against the lower mold half 6 and the tubular material within the mold block expanded to size.

It will be understood that I have described only one of numerous possible structural embodiments of a machine capable of carrying out my process for making hollow articles. This description is presented for the sake of clarity and is not to be considered as a limitation on my process.

In my process tubular, plastic material is supplied to the molds in a suitable condition for forming. The term "tubular" is herein used to describe a hollow member, although this hollow member need not necessarily be cylindrical. The material may be existing tubular forms which are passed through a machine which will heat them to a suitable temperature for blowing. Preferably, however, this operation is eliminated by extruding the tube as it is needed and feeding it directly from the extruder to the molding machine. In either case my invention contemplates a tube of material in condition for blowing being supplied to the molding machine as a continuously moving column or member.

The molds are, one by one, successively moved into tangential alignment with this moving member of tubular material. The speed at which the molds are moved is synchronized to the rate of lineal movement of the member of tubular material. The angular velocity of the table 2 and the lineal velocity of the tubular material may be synchronized such that the molds are moved at the same speed as the tubular material or slightly faster than the tubular material to effect a slight stretching of the tubular material. How the molds are aligned with the member of tubular material is not critical to my invention. Preferably, the molds are travelling along an endless path but the shape and the vertical or horizontal disposition of the plane of this path is immaterial.

As the member of tubular material and the molds become aligned, the separable members of the mold, that is, the upper and lower mold halves, receive the member of tubular material between them. When the member of tubular material is aligned with the mold, the separable halves of the mold are brought together, thus, closing the mold. As the mold is closed, the jaws 19 and 20 collapse the member of tubular material at each end of the mold. This pressing together or collapsing of the member of tubular material occurs only between the jaws. The section of the member of tubular material within the mold is not affected. The jaws 19 and 20 press the sides of the member of tubular material together sufficiently to seal each end of the section of tubular material within the mold against the passage of a fluid under pressure. Thus, each individual portion or section of the member of tubular material clamped within each mold becomes a sealed, fluid-tight chamber isolated from every other section and from the rest of the member of tubular material extending between the last mold to be closed and the source of the member of tubular material.

The action of the jaws 19 and 20 upon the member of tubular material is preferably a squeezing action rather than a cutting action. The recessing of the jaws permits a small neck of material to remain for connecting the sections within each of the molds one to another and to the tubular material issuing from the extruder.

When the section of the member of tubular material within each mold has been isolated as a separate, sealed container by the jaws 19 and 20, this section is expanded to fill the mold cavity by admission of a gas or liquid through the needle 16. The needle pierces or punctures the section of the tubular material either as or after the mold halves are clamped together. The flow of the gas or liquid through the needle is regulated to occur only after the jaws have effected the isolation of the section of tubular material within the individual mold. The temperature of the fluid admitted through the needle may be regulated to suit the requirements of the particular material or object being molded. The temperature of each of the molds may be regulated by means of the passage of suitable fluid through the fluid chambers 22.

When the small neck of compressed tubular material is permitted to remain between each molded section, the hollow articles are removed as a continuous string from the molds. After removal, the individual articles are separated. Although removal of the articles as a string is preferable, they may be individually removed. When such is desired, the jaws 19 and 20 are designed either to sever the tubular material or to so nearly sever it that the individual articles become separated in the process of removal from the die. The portion of each of the articles formed in the extended neck portion 14 of the mold cavity is not designed to become a part of the finished article. This portion is removed from the article when the article is processed after removal from the mold. Thus, the opening created by the piercing action of the needle does not appear in the finished product.

It is contemplated that each of the steps of introducing the member of tubular material to the mold, closing the mold, sealing the tubular material at each end of the mold, expanding the tube within the mold and removing the molded articles from the mold will each be performed while both the molds and the tubular material are continuously in motion. Since the movement of the molds is continuous, the only limitation upon the production rate of a machine employing my process is the capacity of the machine supplying the basic tubular material.

The setting of the material in the molds after the article has been blown may be regulated by the temperature of the fluid circulated through the fluid chambers 22.

The fluid used to expand the tubular material against the walls of the mold cavity may be either an inert gas, such as air, or an inert liquid, or it may be a fluid having some treating effect on the plastic, such as a hardening agent, or a coating or coloring material.

The composition of the plastic tubular material has been herein referred to as "thermoplastic" primarily because presently known types of thermo-setting plastics are not suitable to the type of operation above described. However, it will be clearly understood that this invention is not limited to the use of thermo-plastic materials as such, and that the term "thermo-plastic" as used in the present specification and claims shall refer to any material having generally the necessary plasticity characteristics.

It is possible to design each of the molds to have two individual mold cavities with a separate needle for introducing fluid to the tubular material in each cavity. Numerous other modifications of my process may be made, each without departing from the scope of my invention. It is not my intention, implied or otherwise, to exclude such modifications from the hereinafter appended claims unless specifically stated to the contrary in these claims.

I claim:

1. In a method for making plastic hollow ware, the steps which include: introducing softened, tubular, organic, plastic material into a mold; sealing said tubular material at each end of the mold against the passage of a fluid; piercing the tubular material within the mold for creating an opening; introducing a fluid into the tubular material within the mold through said opening under a positive pressure sufficient to expand said plastic material to the shape of said mold.

2. In a method for making plastic hollow ware, the steps which include: providing a continuously moving tube of softened, organic, plastic material; successively hermetically isolating portions of said tube in individual mold chambers; moving said mold chambers at a speed synchronized with the movement of said tube; individually introducing a gas into each of said isolated portions under a positive pressure sufficient to expand said plastic material to the shape of said mold chamber.

3. In a method for making plastic articles, the steps which include: successively introducing softened, tubular, organic, plastic material into a plurality of individual molds; sealing said tubular material at each end of each of the molds against the passage of a fluid; piercing the tubular material within each of the molds for creating an opening; introducing a fluid under a positive pressure into the tubular material within each of the molds through said opening and thereby expanding said tubular material within each of said molds to the shape of said molds; removing the molded articles from said molds as a substantially continuous string.

4. In a method for making plastic articles, the steps which include: providing a continuously moving tube of softened, organic, plastic material; successively arranging a plurality of molds coaxially with said tube; moving said molds continuously, synchronizing the speed of said molds with the speed of said tubular material; individually clamping each of said molds about said tubular material; collapsing said tubular material at each end of each of said molds for isolating the portion of said tubular material in each of said molds into a fluid-tight chamber; individually introducing into each of said isolated portions a gas under a positive pressure sufficient to expand said plastic material to the shape of said molds.

5. In a method for making plastic hollow ware, the steps which include: providing a continuously moving tube of softened, organic, plastic material; providing a plurality of individual molds; moving said molds at a speed synchronized to the movement of said tube of material; surrounding said tube of material with said molds; locally collapsing and sealing said tube of material against the passage of a fluid at each end of each of said molds; introducing a fluid under a positive pressure into the portion of said tube of material within each of said molds, said pressure being sufficient to expand said plastic material to the shape of said mold.

6. In a method for making plastic hollow ware having an open neck portion, the steps which include: successively introducing a tube of softened, organic, plastic material into each of a succession of individual molds each having a main body cavity, a neck forming cavity and a neck extension forming cavity; forcing the sides of said tube together at each end of each of said molds for sealing said tube, and thereby forming a fluid-tight chamber within said tube and between said sealed ends; piercing said tube in said neck extension forming cavity; introducing a fluid into said chamber through said pierced opening under a positive pressure sufficient to expand said tube between said sealed ends, and thereby expanding said tube to fill said cavities of said mold; successively removing said expanded tube from said molds; removing said neck extension portion of said expanded tube.

7. In a method for making in a mold having a molding chamber including a main body cavity, a neck forming cavity and a neck extension cavity, a hollow, plastic container having an open neck portion, the steps which include: introducing softened, organic, plastic, tubular material into said mold; sealing against the passage of a fluid said tubular material at the extremities of said molding chamber; puncturing said tubular material in the neck extension portion of said mold cavity; introducing a fluid into said tubular material through the opening punctured therein under a positive pressure sufficient to expand said tubular material to the shape of said molding chamber.

8. In a method for making plastic articles, the steps which include: successively introducing softened, tubular, organic, plastic material into a plurality of individual molds; successively sealing said tubular material at each end of each of the molds against the passage of a fluid; successively piercing the tubular material within each of the molds for creating an opening; successively introducing a fluid under a positive pressure into the tubular material within each of the molds through said opening, and thereby expanding said tubular material within each of said molds to the shape of said molds; successively removing the molded articles from said molds as a substantially continuous string.

9. In a method for making plastic hollow ware having an open neck portion, the steps which include: successively introducing a tube of softened, organic, plastic material into each of a succession of molds each having a main body cavity, a neck forming cavity and a neck extension forming cavity; forcing the sides of said tube together at each end of each of said molds for sealing said tube and forming a fluid-tight chamber within said tube and between said sealed ends; piercing said tube in said neck extension forming cavity; introducing a fluid into said tube through said pierced opening under a positive pressure sufficient to expand said tube between said sealed ends, and thereby expanding said tube to fill said cavities of said mold; removing said expanding tube from said mold.

10. In a method for making plastic hollow ware, the steps which include: providing a substantially continuous tube of said softened, plastic materials; presenting a succession of molds to said tube; locally collapsing said tube at each end of each of said molds and thereby successively creating a plurality of hermetically isolated portions, one in each of said molds; individually introducing into each of said isolated portions a fluid under a positive pressure sufficient to expand said tube to the shape of said mold.

11. In a method for making plastic hollow ware, the steps which include: providing a substantially continuous tube of softened, plastic material; presenting a succession of molds to said tube; locally collapsing and sealing said tube against the passage of a fluid at each end of each of said molds and thereby creating a plurality of hermetically isolated portions, one in each of said molds; individually introducing a fluid into the isolated portion in each of said molds under a positive pressure sufficient to expand said isolated portion to the shape of said mold.

ELMER E. MILLS.

REFERENCES CITED

The following references are of record in the file of this patent:

UNITED STATES PATENTS

| Number | Name | Date |
|---|---|---|
| 1,263,141 | Strauss | Apr. 16, 1918 |
| 1,654,647 | Heist | Jan. 3, 1928 |
| 2,187,432 | Powers | Jan. 16, 1940 |
| 2,192,507 | Schavoir | Mar. 5, 1940 |
| 2,321,319 | Rempel | June 8, 1943 |
| 2,515,093 | Mills | July 11, 1950 |